US010911216B2

(12) United States Patent
Li et al.

(10) Patent No.: US 10,911,216 B2
(45) Date of Patent: Feb. 2, 2021

(54) DATA ENCRYPTION AND DECRYPTION

(71) Applicant: Advanced New Technologies Co., Ltd., Grand Cayman (KY)

(72) Inventors: Lichun Li, Hangzhou (CN); Wenzhen Lin, Hangzhou (CN); Huazhong Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/888,531

(22) Filed: May 29, 2020

(65) Prior Publication Data
US 2020/0295917 A1    Sep. 17, 2020

Related U.S. Application Data

(63) Continuation of application No. PCT/CN2019/081055, filed on Apr. 2, 2019.

(30) Foreign Application Priority Data

Jun. 28, 2018  (CN) .......................... 2018 1 0687002

(51) Int. Cl.
*H04L 9/00* (2006.01)
*G06F 7/72* (2006.01)
*H04L 9/08* (2006.01)

(52) U.S. Cl.
CPC .............. *H04L 9/008* (2013.01); *G06F 7/727* (2013.01); *H04L 9/0869* (2013.01)

(58) Field of Classification Search
CPC ........ H04L 9/008; H04L 9/0869; G06F 7/727
(Continued)

(56) References Cited

U.S. PATENT DOCUMENTS 8,024,274 B2 * 9/2011 Parkes ................. H04L 9/3218
705/64
8,306,227 B2 * 11/2012 Tsunoo ................. H04L 9/002
380/277
(Continued)

FOREIGN PATENT DOCUMENTS

CN           1875569        12/2006
CN          102016958        4/2011
(Continued)

OTHER PUBLICATIONS

Chao, "Research on Related Algorithms of Fully Homomorphic Encryption", Dissertation for Doctoral Degree, Shandong University, Nov. 20, 2015, 160 pages (with English Abstract).
(Continued)

*Primary Examiner* — Teshome Hailu
(74) *Attorney, Agent, or Firm* — Fish & Richardson P.C.

(57) ABSTRACT

This disclosure relates to data encryption and decryption. In one aspect, a method includes receiving, by a second peer end computing device, first data from a first peer end computing device. The second end computing device generates a random term based on a result range pre-agreed upon with the first peer end computing device. The result range includes a minimum result value and a maximum result value. The random term is a product of a random number and an agreed upon constant. The agreed upon constant is greater than a difference between the maximum result value and the minimum result value. The second peer end computing device performs a homomorphic operation based on the first data, local private second data, and the random term to obtain an encryption result. The second peer end computing device returns the encryption result to the first peer end computing device.

13 Claims, 4 Drawing Sheets

(58) Field of Classification Search
USPC .......................................................... 380/28
See application file for complete search history.

(56) References Cited

U.S. PATENT DOCUMENTS

| | | | |
|---|---|---|---|
| 2006/0190724 A1 | 8/2006 | Adams et al. | |
| 2008/0011011 A1* | 1/2008 | Van Meter | F25C 1/04 62/344 |
| 2009/0182667 A1* | 7/2009 | Parkes | H04L 9/3033 705/50 |
| 2011/0033046 A1* | 2/2011 | Nonaka | H04L 9/3093 380/46 |
| 2011/0110525 A1 | 5/2011 | Gentry | |
| 2012/0063597 A1* | 3/2012 | Tropp | H04L 9/0861 380/259 |
| 2012/0121080 A1* | 5/2012 | Kerschbaum | H04L 9/0643 380/28 |
| 2014/0233731 A1 | 8/2014 | Naccache et al. | |
| 2016/0191233 A1* | 6/2016 | Loftus | G06F 21/602 713/189 |
| 2017/0180115 A1* | 6/2017 | Laine | H04L 9/0618 |

FOREIGN PATENT DOCUMENTS

| | | |
|---|---|---|
| CN | 106100818 | 11/2016 |
| CN | 107852324 | 3/2018 |
| CN | 108933650 | 12/2018 |
| WO | WO 2017106258 | 6/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Jing, "Design and implementation of privacy-based LBSNS (Location-Based Social Network Service) based on Privacy-preserving", Thesis for the degree of Master of Engineering, Nanjing Universityof Posts and Telecommunications, Mar. 2015, 80 pages (with English abstract).

Nakamoto, "Bitcoin: A Peer-to-Peer Electronic Cash System," www.bitcoin.org, 2005, 9 pages.

PCT International Search Report and Written Opinion in International Application No. PCT/CN2019/081055, dated Jun. 20, 2019, 10 pages (with partial English translation.

* cited by examiner

DATA ENCRYPTION AND DECRYPTION

CROSS-REFERENCE TO RELATED APPLICATIONS

This application is a continuation of PCT Application No. PCT/CN2019/081055, filed on Apr. 2, 2019, which claims priority to Chinese Patent Application No. 201810687002.0, filed on Jun. 28, 2018, and each application is hereby incorporated by reference in its entirety.

TECHNICAL FIELD

One or more implementations of the present specification relate to the field of data transmission security, and in particular, to data encryption and decryption methods and apparatuses.

BACKGROUND

With the development of the Internet and the birth of the cloud computing concept, homomorphic encryption becomes increasingly important as people's needs for ciphertext search, ciphertext transmission, and multi-party computation keep growing. Homomorphic encryption is a type of encryption method with special natural attributes. Compared with a common encryption algorithm, homomorphic encryption can implement multiple computation functions between ciphertexts in addition to basic encryption operations. It allows people to perform a specific algebraic operation on a ciphertext to obtain a result that is still encrypted. A result obtained by decrypting the ciphertext is the same as a result obtained by performing a same operation on a plaintext. In other words, performing computation before decryption can be equivalent to performing computation after decryption.

The previous nature of homomorphic encryption makes it greatly advantageous in multiple information security protection scenarios. A third party can be entrusted to process data without disclosing information. In addition, the homomorphic encryption technology can be used to compute multiple ciphertexts at the same time before decryption, and a high computation cost caused by decrypting each ciphertext separately is unnecessary. The homomorphic encryption technology can further be used for a party without a key to implement ciphertext computation, and the ciphertext computation does not need to be performed by a party with the key. Therefore, a communication cost can be reduced and a computation task can also be transferred, thereby balancing computation costs of the parties. Moreover, the homomorphic encryption technology can be used to enable a decryption party to determine only a final result, but cannot obtain each ciphertext message, thereby further improving information security.

However, in some cases, a certain party in multi-party computation may steal original data of another party by constructing a special field into a disguised ciphertext in homomorphic encryption.

Therefore, an improved solution is expected to further improve security of data transmission in homomorphic encryption.

SUMMARY

One or more implementations of the present specification describe data encryption and decryption methods and apparatuses. A specially constructed random term is introduced based on an agreed result range to obfuscate data outside the correct result range, so as to prevent one party from stealing private data of another party and increase security of encrypted transmission.

According to a first aspect, a data encryption method is provided, including: receiving first data from a peer end; generating a random term R based on a result range pre-agreed with the peer end, where the result range includes a minimum result value a and a maximum result value b, the random term R is a product of a random number r and an agreed constant c, and the agreed constant c is greater than a difference between the maximum result value b and the minimum result value a; performing a homomorphic operation based on the first data, local private second data, and the random term to obtain an encryption result; and returning the encryption result to the peer end.

In an implementation, the performing a homomorphic operation to obtain an encryption result specifically includes the following: performing a first homomorphic operation based on the first data and the second data to obtain a first operation result; and performing a second homomorphic operation based on the first operation result and the random term to obtain the encryption result.

Further, in an implementation, the performing a second homomorphic operation based on the first operation result and the random term includes the following: obtaining a difference between the first operation result and the minimum result value a as a second operation result; and performing homomorphic summation and encryption on the second operation result and the random term to generate the encryption result.

In a possible design, the minimum result value a is 0, and the maximum result value b is an n-digit natural number; and the agreed constant c is $10^n$, so that the last n digits in the random term R that are sorted from a high digit to a low digit are all 0s, where n is a natural number.

In a possible design, the minimum result value a is 0, the maximum result value b is $2^n$, the agreed constant c is $2^{(n+1)}$, the random term is represented in binary, and in a binary representation of the random term R, the last n digits sorted from a high digit to a low digit are all 0s, where n is a natural number.

In an implementation method, a value of the agreed constant c is $\Delta+1$, where $\Delta$ is the difference between the maximum result value b and the minimum result value a.

According to a second aspect, a data decryption method is provided, including: receiving a homomorphic encryption result, where the encryption result is generated based on the encryption method according to the first aspect; performing homomorphic decryption on the encryption result to obtain a decryption result; obtaining a remainder of the decryption result modulo the agreed constant c; and determining a first operation result value based on the remainder.

In an implementation, the determining a first operation result value based on the remainder further includes the following: determining that the operation result value is a sum of a value of the remainder and the minimum result value a.

In a possible design, the agreed constant c is $10^n$; and in this case, the modulo operation includes obtaining the last n digits in the decryption result that are sorted from a high digit to a low digit as the remainder.

In a possible design, both the decryption result and the random term are represented in binary, and in a binary representation of the random term, the last n digits sorted from a high digit to a low digit are all 0s; and in this case, the modulo operation includes obtaining the last n digits in a binary representation of the decryption result that are sorted from a high digit to a low digit as the remainder.

According to a third aspect, a data encryption apparatus is provided, including: a receiving unit, configured to receive first data from a peer end; a random generation unit, configured to generate a random term R based on a result range pre-agreed with the peer end, where the result range includes a minimum result value a and a maximum result value b, the random term R is a product of a random number r and an agreed constant c, and the agreed constant c is greater than a difference between the maximum result value b and the minimum result value a; an operation unit, configured to perform a homomorphic operation based on the first data, local private second data, and the random term to obtain an encryption result; and a sending unit, configured to return the encryption result to the peer end.

According to a fourth aspect, a data decryption apparatus is provided, including: a receiving unit, configured to receive a homomorphic encryption result, where the encryption result is generated by the apparatus through encryption; a decryption unit, configured to perform homomorphic decryption on the encryption result to obtain a decryption result; a modulo unit, configured to obtain a remainder of the decryption result modulo an agreed constant c; and a determining unit, configured to determine an operation result value based on the remainder.

According to a fifth aspect, a computer-readable storage medium is provided, where the computer-readable storage medium stores a computer program, and when the computer program runs on a computer, the computer is enabled to perform the methods according to the first aspect and the second aspect.

According to a sixth aspect, a computing device is provided, and includes a memory and a processor, where the memory stores executable code, and when the processor executes the executable code, the methods according to the first aspect and the second aspect are implemented.

According to the methods and apparatuses provided in the implementations of the present specification, a specially constructed random term is introduced into an encryption result based on an agreed result range and a predetermined constant, so that the random term does not affect an operation result within the correct result range, but obfuscates data outside the correct result range. If a first end sends normal data in homomorphic encryption, an operation result obtained after a second end performs an operation should fall within an agreed result range, and the first end can restore the operation result from an encryption result. If the first end sends specially constructed unauthentic encrypted data, an operation result exceeds the correct result range. Such a part that exceeds the correct result range will be obfuscated by a random term, and an authentic value of the part cannot be determined. Therefore, the first end cannot steal private data of the second end by using the part that exceeds the result range. As such, when no additional communication is added, the private data of the second end can be prevented from being stolen by the first end.

BRIEF DESCRIPTION OF DRAWINGS

To describe the technical solutions in the implementations of the present disclosure more clearly, the following briefly describes the accompanying drawings needed for describing the implementations. Clearly, the accompanying drawings in the following description show merely some implementations of the present disclosure, and a person of ordinary skill in the art can still derive other drawings from these accompanying drawings without creative efforts.

DESCRIPTION OF IMPLEMENTATIONS

The following describes the solutions provided in the present specification with reference to the accompanying drawings.

Figure 1:
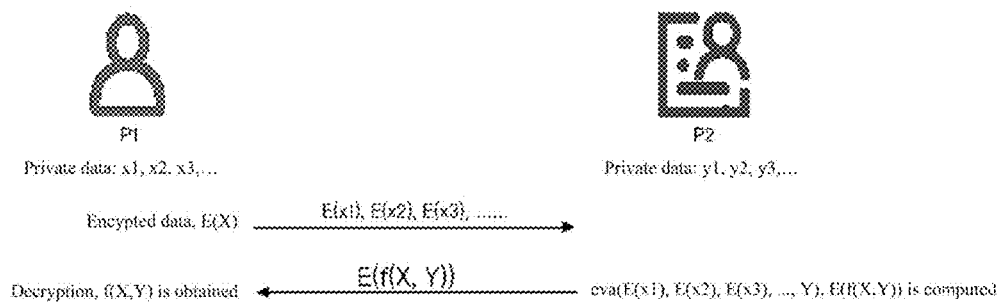
FIG. 1 is a schematic diagram illustrating an implementation scenario of transmission in homomorphic encryption, according to an implementation.

FIG. 1 is a schematic diagram illustrating an implementation scenario, according to an implementation of the present specification. FIG. 1 shows a process that both parties perform homomorphic encryption and data transmission. In the process, first, a first end P1 performs homomorphic encryption on its private data $X(x1,x2,x3 \ldots)$ to obtain encrypted data $E(X)$, which specifically includes $E(x1)$, $E(x2)$, $E(x3) \ldots$ . Then, the first end P1 transmits the encrypted data $E(x1)$, $E(x2)$, $E(x3)$, etc. to a second end P2.

The second end has private data $Y(y1,y2,y3 \ldots)$. After receiving the encrypted data $E(X)$ transmitted by the first end, the second end performs a further operation based on the encrypted data $E(X)$ and its private data Y. Operation logic is represented as a function f. Based on principles of homomorphic encryption and homomorphic operation:

$$F(E(x1),E(x2),E(x3)\ldots,Y)=F(E(X),Y)=E(f(X,Y))$$

F is a homomorphic operation function corresponding to the function f, and $F=Homo_f$, so that a decrypted plaintext corresponds to an operation of the function f.

Therefore, the second end P2 obtains an encrypted operation result $E(f(X,Y))$, and returns the result to the first end P1. The first end P1 decrypts the received operation result to obtain a value of $f(X,Y)$. As such, the second end P2 does not need to and cannot know a value of the private data X of the first end, and can directly perform a needed operation based on the encrypted data $E(X)$. The first end P1 can directly obtain the computation result $f(X,Y)$ related to the private data Y of the second end P2 without knowing Y, so that both the first end and the second end can perform data operations without knowing the private data of each other.

However, after observation, in an actual transmission process in homomorphic encryption, it is possible that one party, for example, the P1 end, does not send the ciphertext $E(X)$ with a normal data structure of an agreed homomorphic encryption algorithm to the peer P2, but sends a ciphertext of a specially constructed plaintext or another specially constructed string, which is denoted here as $E(X')$, to attempt to steal information about the private data Y of P2. After P2 performs a function operation on the data $E(X')$ from P1 and the local private data Y, an obtained computation result is in a ciphertext form, that is, E(f(X',Y)). Without a key of the P1 end, P2 cannot determine, based on the ciphertext form, whether the computation result satisfies an agreement or falls within a normal range.

The following describes a process of normal homomorphic encryption and homomorphic encryption deception with reference to specific examples.

Figure 2A:
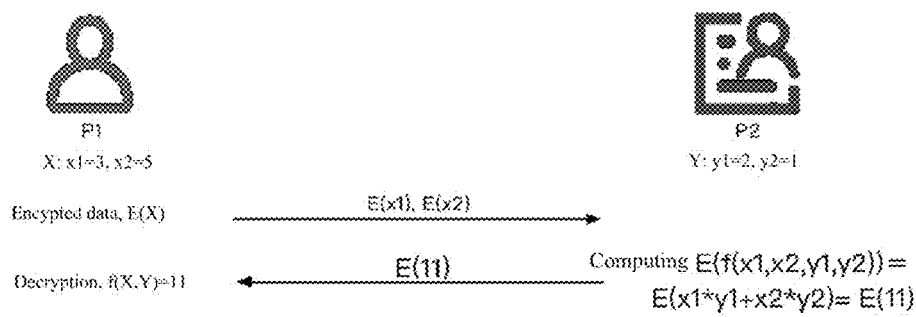
FIG. 2A illustrates a specific example of normal homomorphic encryption.

FIG. 2A illustrates a specific example of normal homomorphic encryption. In the example, a P1 end has private data X(x1=3,x2=5). P1 performs homomorphic encryption on the private data, and transmits encrypted data E(x1) and E(x2) to a second end P2.

The second end P2 has private data Y(y1=2,y2=1). After receiving the encrypted data transmitted by the first end P1, the second end performs a further operation based on the encrypted data E(X) and the private data Y of the second end. Assuming that operation logic f can be represented as follows:

$$f(X,Y)=x1*y1+x2*y2$$

Then, P2 can perform computation based on E(X) and Y to obtain the following:

$$E(f(X,Y))=E(x1*y1+x2*y2)=E(11)$$

Therefore, the second end P2 can return an encryption result E(11) obtained through the operation to the first end P1. The first end P1 can perform decryption to obtain f(X,Y)=11. In the conventional transmission process in homomorphic encryption, the P1 end only knows the operation result f(X,Y), but cannot know a specific value of Y.

Figure 2B:
FIG. 2B illustrates a specific example of homomorphic encryption deception.

However, it is possible to steal the private data Y of P2 by constructing a special plaintext or field. FIG. 2B illustrates a specific example of homomorphic encryption deception. Similar to the description in FIG. 2A, a P1 end has private data X(x1=3,x2=5). However, different from the description in FIG. 2A, P1 does not transmit authentic data E(x1) and E(x2) in homomorphic encryption to a second end P2 during transmission, but adds constructed data 100 and 10000 and transmits forged data E(x1+100) and E(x2+10000) to P2.

After receiving the ciphertext data transmitted by P1, P2 performs an operation normally, but an actual operation process is as follows:

$$\begin{aligned}E(f(100+x1, 10000+x2, y1, y2))&\quad\text{(equation 1)}\\=E(x1*y1+x2*y2+100*y1+10000*y2)\\=E(10211)\end{aligned}$$

Then, P2 returns the result to P1 normally, and P1 can obtain f(X',Y)=10211 through decryption. In this case, if P1 has determined that f(X,Y)=11 through the process in FIG. 2A or P1 knows in advance that a correct result of f(X,Y) has no hundreds place, it can be determined, from equation (1) based on a setting method for constructing the data 100 and 10000, that a number corresponding to the hundreds place should be y1, and a number corresponding to a ten-thousands place should be y2. Therefore, P1 can infer that y1=2 and y2=1. As such, P1 steals private data y1 and y2 of the P2 end by constructing the data.

As described above, because a computation result E(f) of P2 is in a ciphertext form, it is difficult for P2 to determine whether the computation result is normal. The data E(X) transmitted by the P1 end is also in an encrypted form. Therefore, to determine whether E(X) is normal data, a large amount of additional computation and a large amount of additional communication are also needed. Based on such a consideration, in the implementations of the present specification, P1 and P2 pre-agree on a normal range of a computation result. On this basis, when performing an operation, P2 can generate a random term based on the pre-agreed range, so that the random term does not affect an operation result within the normal range, but obfuscates an operation result outside the normal range, so as to prevent P1 from stealing the private data of P2 by constructing special data. The following describes a specific implementation method of the concept.

Figure 3:
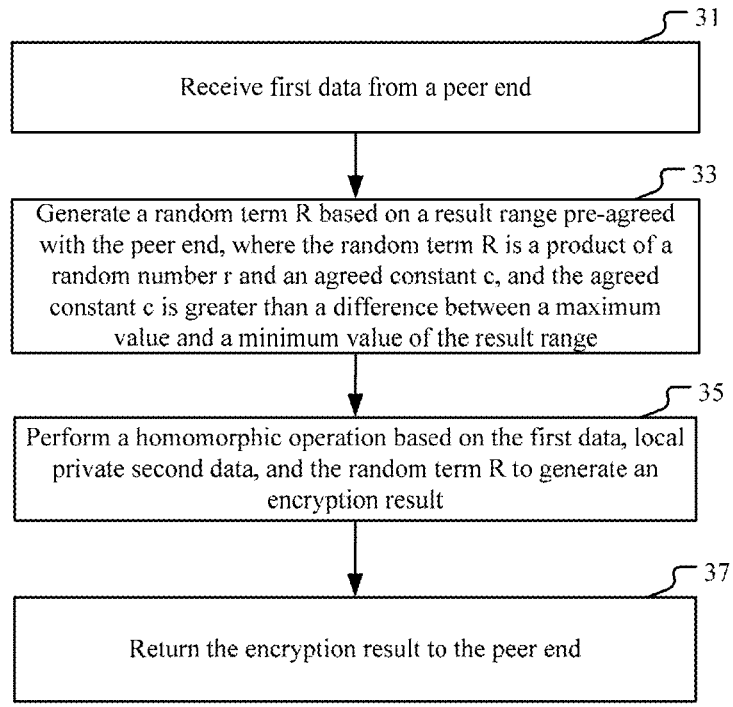
FIG. 3 is a flowchart illustrating a data encryption method, according to an implementation.

FIG. 3 is a flowchart illustrating a data encryption method, according to an implementation. The method is performed by a party that receives encrypted data and performs a data operation, for example, the second end P2 in FIG. 1, FIG. 2A, and FIG. 2B. As shown in FIG. 3, the encryption method includes the following: Step 31: Receive first data from a peer end. Step 33: Generate a random term R based on a result range pre-agreed with the peer end, where the random term R is a product of a random number r and an agreed constant c, and the agreed constant c is greater than a difference between a maximum value and a minimum value of the result range. Step 35: Perform a homomorphic operation on the first data, local private second data, and the random term R to generate an encryption result. Step 37: Return the encryption result to the peer end. The following describes execution methods of the steps in FIG. 3.

It can be understood that the method in FIG. 3 is used to perform data processing and encryption between two data transmission parties. The two data transmission parties can be referred to as a first end and a second end. The first end provides encrypted data, and requests to obtain an encrypted operation result of a further operation performed based on the encrypted data. For example, the first end can be the P1 end in FIG. 1, FIG. 2A, and FIG. 2B. The second end receives encrypted data, and performs a further operation based on the encrypted data, so as to obtain an encrypted operation result and return the encrypted operation result to the first end. For example, the second end can be the P2 end in FIG. 1, FIG. 2A, and FIG. 2B. The method steps in the flowchart in FIG. 3 are performed by the second end P2.

Before executing the method, both communication parties, that is, the first end P1 and the second end P2, need to agree on a correct result range of the encrypted operation result. Generally, for security purposes, P1 and P2 can agree on the result range by using a method different from the encrypted transmission communication method before the encrypted transmission process starts. Without loss of generality, the result range can be represented as [a,b], where a represents the minimum result value and b represents the maximum result value.

When the first end and the second end have agreed on the correct result range of the encrypted operation result, the second end can perform data encryption by using the method shown in FIG. 3.

First, in step 31, the first data is received from the peer end. In the schematic diagram of FIG. 4, P2 receives data from the first end P1. The received data is referred to as first data here. However, in the present step, P2 does not know whether the first data is normal encrypted data obtained by the first end P1 by performing homomorphic encryption on private data of the first end P1 based on an agreement, or is ciphertext data with specially constructed data added. For example, if private data X of the first end P1 includes x1 and x2, the first data E(X) received from the first end can be represented as $c1=E(x1+p1)$ and $c2=E(x2+p2)$, and values of p1 and p2 are not known here. When p1 and p2 are both 0, the first data c1 and c2 are authentic data obtained by performing homomorphic encryption based on the agreement. If p1 and/or p2 are/is not 0, the first data is specially constructed forged data.

After the first data is received, in step 33, the random term R is generated based on the result range pre-agreed with the peer end, where the random term R is a product of the random number r and the agreed constant c, and the predetermined constant c is greater than the difference between the maximum value and the minimum value of the result range; and in step 35, a further homomorphic operation is performed based on the first data received in step 31, the local private second data, and the random term R generated in step 33, to obtain the encryption result, which is returned to the first end P1.

The following describes execution of steps 33 and 35 with reference to different pre-agreed result ranges.

In a first implementation, the minimum value of the agreed result range is 0. Therefore, the result range can be represented as [0,b].

In an example of the first implementation, the constant c can be set to any value greater than b. For example, in a relatively simple case, c is set to c=b+1. For example, if the agreed result range is [0.99], c can be set to 100, or if the agreed result range is [0.63], c can be set to 64.

In another example of the first implementation, considering a number of digits of the maximum value b of the result range, assuming that b is an n-digit natural number, the constant c is set to $10^n$ regardless of a specific value of b. Then, the random number r is generated. As such, after the constant c is multiplied by the random number r to obtain the random term, higher digits of the random term correspond to the random number r, and lower n digits are all 0s. For example, in the previous example, regardless of whether M is 99 or 63, M is a 2-digit natural number. In this case, c is set to $10^2=100$. Therefore, in the random term R obtained after the constant 100 is multiplied by the random number r, the last two digits, that is, the lower two digits, are always all 0s. For example, if r=2356, the random term is 235600, and lower two digits are both 0s.

In another example of the first implementation, the result range is represented in binary, where the maximum result value b can be represented as $2^n$. In this case, the constant c can be set to $2^{(n+1)}$ in a binary representation, so that lower n digits are all 0s in a binary representation of the random term obtained by multiplying the random number and the constant c.

It should be understood that, because the result range is pre-agreed on by the two communication ends, the constant c can also be predetermined or pre-agreed on by the two ends. For example, the constant c is set or agreed on when the result range is agreed on.

As such, in the first implementation, the random term R=r*c is generated based on the constant c and the random number r.

Next, in step 35, a homomorphic operation is performed based on the first data received from the first end, the local private second data of the second end, and the random term R generated in step 33.

In an implementation, a first homomorphic operation can be first performed based on the first data and the local private second data to obtain a first operation result. In the present process, the second end P2 does not determine and distinguish the first data E(X) received from P1, but normally performs a homomorphic operation with reference to the local private data (referred to as the second data here, corresponding to the data Y in FIG. 4), to obtain the first operation result, that is, E(f(X,Y)). Then, an operation is performed by combining the first operation result with the previous random term, that is, a further homomorphic operation is performed, to obtain the encryption result. In the first implementation, the further homomorphic operation is homomorphic summation and encryption on the first operation result and the random term R, so as to obtain the following encryption result:

$$E(f(X,Y)+R)$$

However, an operation process of the encryption result is not limited to the previous implementation. The following uses $f(X,Y)=x1*y1+x2*y2$ as an example for description.

When the first homomorphic operation and the second homomorphic operation are separately performed as described in the previous implementation, an operation is first performed on $E(x1*y1+x2*y2)$ to obtain a first operation result, and then a second homomorphic operation is performed to obtain $E(x1*y1+x2*y2+R)=E(f(X,Y)+R)$.

In another implementation, a homomorphic operation can also be directly performed on the first data, the second data, and the random term, without distinguishing the first homomorphic operation process from the second homomorphic operation process, or using a different homomorphic operation sequence.

For example, in an example, $E(x1*y1)$, $E(x1*y1+R)$, and $E(x1*y1+R+x2*y2)=E(f(X,Y)+R)$ can be computed successively. Certainly, alternatively, $E(x2*y2)$, $E(x2*y2+R)$, and $E(x2*y2+R+x1*y1)=E(f(X,Y)+R)$ can be computed successively.

Or, in an example, $E(x1*y1+x2*y2+R)$ can be directly computed, so as to directly obtain the encryption result $E(f(X,Y)+R)$.

Regardless of a specific homomorphic operation sequence, the encryption result $E(f(X,Y)+R)$ obfuscated by the random term can be finally obtained.

It can be understood that if the first end P1 sends normal data E(X) in homomorphic encryption, an operation result of f(X,Y) should fall within the agreed result range. In the first implementation, $f(X,Y)<b$. For the random term R=r*c, c is always greater than b. Therefore, the random term R actually obfuscates a part that exceeds b without affecting a part less than b. In particular, based on the previous several examples, if b is an n-digit number, the random term R can be designed to have random higher digits (corresponding to the random number r) and have lower n digits being 0s. As such, if f(X,Y) falls within the normal range b, f(X,Y) can be restored from the last n digits of a result of f(X,Y)+R, and a part that exceeds n digits can be obfuscated and overwritten by the higher digits of the random term R.

More generally, in a second implementation, the minimum value of the agreed result range is a, and the maximum value of the agreed result range is b. Therefore, the result range can be represented as [a,b], where a and b each are any integer, for example, [−99.98] or [12.58]. Actually, the first implementation can be considered as a special example with a=0.

Because an agreed result range of f(X,Y) falls between a and b, that is, $a<f(X,Y)<b$, in the second implementation, a second operation function $g(X,Y)=f(X,Y)-a$ can be constructed. Clearly, a correct result range of the second operation function is [0,b−a]. The second operation function is used as an operation function to be processed, and a problem is again converted into a case that the minimum value of the range in the first implementation is 0.

Similarly, the constant c can be set to be greater than b−a. For example, in an example, the constant c is set to c=b−a+1. In another example, if a result of b−a is an n-digit number, the constant c can be set to 10^n.

For example, if an agreed result range of f(X,Y) is [12.58], a result range of the constructed second operation function g(X,Y)=f(X,Y)−12 is [0.46]. The constant c can be set to any value greater than 46. For example, the constant c can be set to 47. Or, more simply, the constant c can be set to 100.

As described above, the constant c can be predetermined or pre-agreed on by both communication ends. For example, the constant c is set or agreed on when the result range is agreed on.

On the basis that the constant c has been set or agreed on, in step 33, the random number r is generated. The product of the previously set constant c and the random number r is used as the random term R.

Next, in step 35, a homomorphic operation is performed based on the first data, the local private second data, and the generated random term R to obtain the encryption result. In an example, the homomorphic operation includes the following: performing a homomorphic operation on the first data and the second data to obtain a first operation result; subtracting the minimum value a of the result range from the first operation result to obtain a second operation result corresponding to the second operation function; and performing homomorphic summation and encryption on the second operation result and the random term R to obtain the following encryption result:

$$E(g(X,Y)+R)=E(f(X,Y)-a+R)=E(f(X,Y)-a+r*c)$$

Similar to the description in the first implementation, an operation process of the encryption result is not limited to the previous example. In another implementation, a homomorphic operation can also be directly performed on the first data, the second data, and the random term, without distinguishing the first operation result from the second operation result, or using a different homomorphic operation sequence. A specific process is omitted here for simplicity.

Regardless of a specific homomorphic operation sequence, the encryption result E(g(X,Y)+R) obfuscated by the random term can be finally obtained.

If the first end P1 sends normal data E(X) in homomorphic encryption, an operation result of f(X,Y) should fall within the agreed result range [a,b], and correspondingly, g(X,Y)=f(X,Y)−a should fall within [0, b−a]. For the random term R=r*c, c is always greater than b−a. Therefore, the random term R actually obfuscates a part of g(X,Y) that exceeds b−a, without affecting a part less than b−a. In particular, in certain specific examples, if b−a is an n-digit number, the random term R can be designed to have random higher digits (corresponding to the random number r) and have lower n digits being 0s. As such, if g(X,Y) falls within the normal range b−a, g(X,Y) can be restored from the last n digits of a result of g(X,Y)+R, and a part that exceeds n digits can be obfuscated and overwritten by the higher digits of the random term R.

As such, the second end can add the specially constructed random term R to the result, so as to generate the encryption result. The encryption result does not affect data within the agreed result range, but can obfuscate data outside the agreed result range. Next, in step 37, the second end returns the encryption result to the peer end, that is, the first end.

The following describes a process that the first end decrypts the received encryption result.

Figure 4:
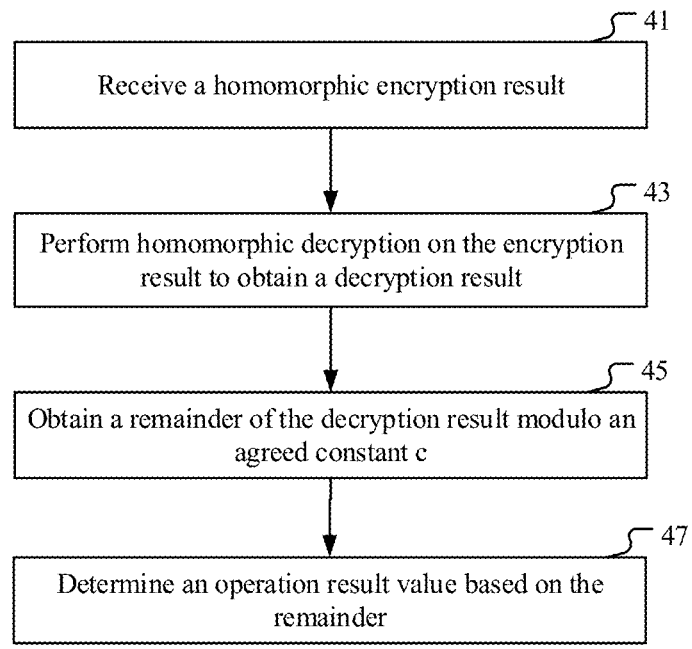
FIG. 4 is a flowchart illustrating a data decryption method, according to an implementation.

FIG. 4 is a flowchart illustrating a data decryption method, according to an implementation. It can be understood that the method steps are performed by an end peering with an execution end of the method in FIG. 3. For example, when the method in FIG. 3 is executed by the second end P2, the method in FIG. 4 is executed by the first end P1. As shown in FIG. 4, the method includes the following: Step 41: Receive an encryption result obtained by performing homomorphic encryption based on the method in FIG. 3. Step 43: Perform homomorphic decryption on the encryption result to obtain a decryption result. Step 45: Obtain a remainder of the decryption result modulo an agreed constant c. Step 47: Determine an operation result value based on the remainder. The following describes execution processes of the steps.

As described above, in step 39 in FIG. 3, the second end returns the encryption result to the peer end, that is, the first end. Correspondingly, in step 41, the first end receives the encryption result from the second end. It can be understood that the encryption result is an encryption result obtained by adding the random term R based on the method in FIG. 3.

The following describes execution methods of subsequent steps still in correspondence to the previous first implementation and second implementation.

In a first implementation, an agreed result range can be represented as [0,b]. Correspondingly, the encryption result sent by the second end can be represented as E(f(X,Y)+R), where R is the random term.

Next, in step 43, homomorphic decryption is performed on the encryption result to obtain the decryption result, that is, to obtain a value d of f(X,Y)+R.

As described above, the random term R can be represented as R=r*c, where r is a random number, c is the agreed constant, and c>b. Therefore, the decryption result d can be represented as follows:

$$d=f(X,Y)+R=f(X,Y)+r*c$$

Based on this, in step 45, the remainder of the decryption result d modulo the agreed constant c can be obtained.

Because an agreed range of f(X,Y) is [0,b], if the first end sends normal data E(X) in homomorphic encryption, a computation result based on this is f(X,Y)≤b; and because c>b, f(X,Y)<c.

Therefore, if the decryption result d is divided by the agreed constant c, a quotient is r, and the remainder is f(X,Y) that is the part less than c.

In a specific example, the agreed constant c is set to 10^n. In this case, a method for performing the modulo operation on the agreed constant c in step 45 is very simple, that is, the lowest n digits in the decryption result d are obtained and are used as the remainder determined after the modulo operation is performed.

In another specific example, the agreed constant c is set to 2^(n+1), and both the decryption result and the random term are represented in binary. Since the agreed constant c is set to 2^(n+1), in a binary representation of the random term R, the first n digits sorted from a low digit to a high digit are all 0s. In this case, a method for performing the modulo operation on the agreed constant c in step 45 is obtaining the first n digits in a binary representation of the decryption result d that are sorted from a low digit to a high digit as the remainder.

As described above, f(X,Y) in a normal operation is always less than c. Therefore, in step 47, the remainder can be determined as a value of the operation result f(X,Y).

In a second implementation, an agreed result range can be represented as [a,b]. Correspondingly, the encryption result sent by the second end can be represented as E(g(X,Y)+R)=E(f(X,Y)−+R), where R is the random term.

Similarly, in step 43, homomorphic decryption is performed on the encryption result to obtain the decryption result, that is, to obtain a value d of g(X,Y)+R.

Here, the random term R can be represented as R=r*c, where r is a random number, c is the agreed constant, and c>b−a. Therefore, the decryption result d can be represented as follows:

$$d = g(X,Y) + R = g(X,Y) + r*c$$

Similar to the first implementation, in step 45, the remainder of the decryption result d modulo the agreed constant c can be obtained.

Because an agreed range of f(X,Y) is [a,b], if the first end sends normal data E(X) in homomorphic encryption, a computation result based on this is a≤f(X,Y)≤b.

Therefore, 0≤g(X,Y)≤b−a.

On the other hand, because c>b−a, g(X,Y)<c.

Therefore, if the decryption result d is divided by the agreed constant c, a quotient is r, and g(X,Y) is used as the remainder of d divided by c because g(X,Y) is less than c.

Similar to the previous description, if the agreed constant c is set to 10^n, the lowest n digits in the decryption result d can be obtained, so as to obtain the remainder determined after the modulo operation is performed. If the agreed constant c is set to 2^(n+1), and both the decryption result and the random term are represented in binary, in a binary representation of the decryption result d, the first n digits sorted from a low digit to a high digit can be obtained as the remainder.

Next, in step 47, the operation result value is determined based on the remainder. Specifically, in the second implementation, step 47 further includes first determining a value of an intermediate operation result g(X,Y) based on the remainder. As described above, the remainder determined in step 45 can be used as the value of the intermediate operation result g(X,Y). Then, the intermediate operation result and the minimum value a of the result range can be added up to obtain a value of the operation result f(X,Y), that is, f(X,Y)=g(X,Y)+a.

Figure 5:
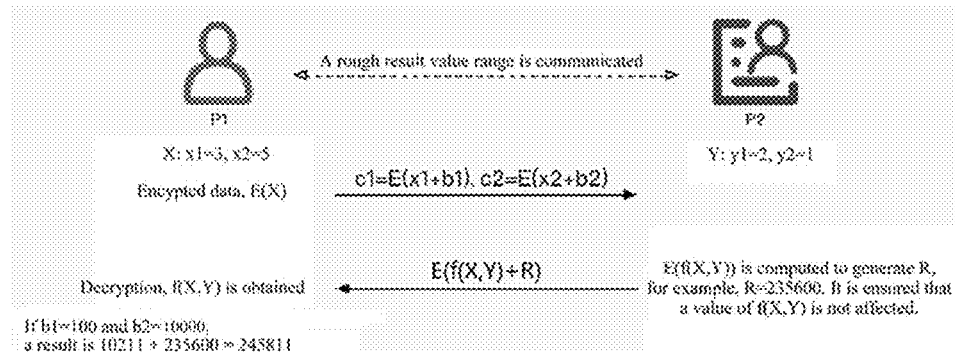
FIG. 5 illustrates an example of a process of performing transmission in homomorphic encryption by using the encryption and decryption methods in FIG. 3 and FIG. 4.

The following describes a completed process of encryption and decryption with reference to a specific example. FIG. 5 illustrates an example of a process of performing transmission in homomorphic encryption by using the encryption and decryption methods in FIG. 3 and FIG. 4.

Assuming that the first end P1 and the second end P2 pre-agree that the correct result range has 2 digits, and the agreed constant c is 100. Then, the first end P1 sends encrypted data E(X'), that is, E(x1+b1) and E(x2+b2), to the second end P2. For example, when b1=100 and b2=10000, data is stolen, as shown in FIG. 2A.

After normally computing E(f(X',Y)), the second end P2 further generates the random term R. For example, if the random number r is 2356, the random term R=r*c=235600. The second end adds the random term R to the encryption result, and returns the encryption result E(f(X',Y)+R) to the first end P1.

f(X,Y)=11 when values of X and Y are the same as the values of X and Y in the examples in FIG. 2A and FIG. 2B. P1 decrypts the encryption result to obtain the decryption result d, and the result d can be broken down as follows:

$$d = f(X', Y) + R = x1*y1 + x2*y2 + 100*y1 + 10000*y2 + R$$
$$= f(X, Y) + 100*y1 + 10000*y2 + R$$
$$= 11 + 10211 + 235600$$
$$= 245811$$

In the result d, a normal value of f(X,Y) can still be extracted by using the last two digits. However, a result of 100*y1+10000*y2 that is designed to steal the private data y1 and y2 of P2 is obfuscated by R. P1 no longer can determine y1 by using a number with a hundreds place and y2 by using a number with a ten-thousands place, as shown in FIG. 2B.

It can be determined from the previous process that the first end P1 and the second end P2 pre-agree on the correct result range and predetermine the constant c. P2 introduces the specially constructed random term into the encryption result based on the agreed result range and the predetermined constant, so that the random term does not affect an operation result within the correct result range, but obfuscates data outside the correct result range. If the first end P1 sends normal data in homomorphic encryption, an operation result obtained by the second end P2 by performing an operation should fall within the agreed result range. In this case, the first end P1 can restore the operation result from the encryption result. If the first end P1 sends specially constructed inauthentic encrypted data, an operation result exceeds the correct result range, and such a part that exceeds the correct result range will be obfuscated by the random term, and an authentic value of the part cannot be determined. Therefore, P1 cannot steal the private data of P2 by using the part that exceeds the result range. As such, when no additional communication is added, the private data of the second end can be prevented from being stolen by the first end.

Figure 6:
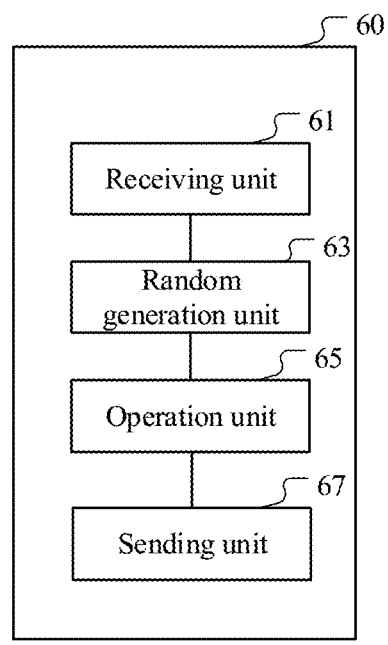
FIG. 6 is a schematic block diagram illustrating a data encryption apparatus, according to an implementation.

According to implementations of another aspect, data encryption and decryption apparatuses are further provided. FIG. 6 is a schematic block diagram illustrating a data encryption apparatus, according to an implementation. As shown in FIG. 6, the data encryption apparatus 60 includes the following: a receiving unit 61, configured to receive first data from a peer end; a random generation unit 63, configured to generate a random term R based on a result range pre-agreed with the peer end, where the result range includes a minimum result value a and a maximum result value b, the random term R is a product of a random number r and an agreed constant c, and the agreed constant c is greater than a difference between the maximum result value b and the minimum result value a; an operation unit 65, configured to perform a homomorphic operation based on the first data, local private second data, and the random term to obtain an encryption result; and a sending unit 67, configured to return the encryption result to the peer end.

In an implementation, the operation unit includes the following (not shown): a first operation module, configured to perform a first homomorphic operation based on the first data and the second data to obtain a first operation result; and a second operation module, configured to perform a second homomorphic operation based on the first operation result and the random term to obtain the encryption result.

Further, in an implementation, the previous second operation module is configured to obtain a difference between the first operation result and the minimum result value a as a second operation result; and perform homomorphic summation and encryption on the second operation result and the random term to generate the encryption result.

According to an implementation, the minimum result value a is 0, and the maximum result value b is an n-digit natural number; and the agreed constant c is 10^n. In this case, the last n digits in the random term R generated by the random generation unit 65 that are sorted from a high digit to a low digit are all 0s, where n is a natural number.

According to an implementation, the minimum result value a is 0, the maximum result value b is 2^n, the agreed constant c is 2^(n+1), and the random term is represented in binary. In this case, in a binary representation of the random term R generated by the random generation unit 65, the last n digits sorted from a high digit to a low digit are all 0s, where n is a natural number.

In an implementation, a value of the agreed constant c is Δ+1, where Δ is the difference between the maximum result value b and the minimum result value a.

Figure 7:
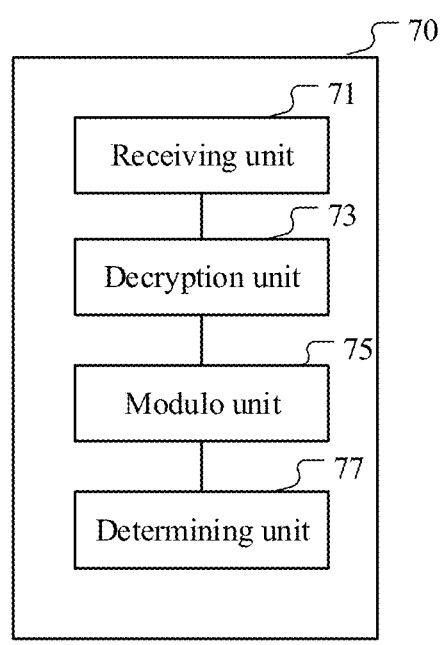
FIG. 7 is a schematic block diagram illustrating a data decryption apparatus, according to an implementation.

FIG. 7 is a schematic block diagram illustrating a data decryption apparatus, according to an implementation. As shown in FIG. 7, the data decryption apparatus 70 includes the following: a receiving unit 71, configured to receive a homomorphic encryption result from the data encryption apparatus 60 in FIG. 6; a decryption unit 73, configured to perform homomorphic decryption on the encryption result to obtain a decryption result; a modulo unit 75, configured to obtain a remainder of the decryption result modulo an agreed constant c; and a determining unit 77, configured to determine an operation result value based on the remainder.

In an implementation, the determining unit 77 is configured to determine that the operation result value is a sum of a value of the remainder and the minimum result value a.

According to an implementation, the agreed constant c is set to 10^n. In this case, the modulo unit 75 is configured to obtain the last n digits in the decryption result that are sorted from a high digit to a low digit as the remainder.

According to an implementation, both the decryption result and the random term are represented in binary, and in a binary representation of the random term, the last n digits sorted from a high digit to a low digit are all 0s. In this case, the modulo unit 75 is configured to obtain the last n digits in a binary representation of the decryption result that are sorted from a high digit to a low digit as the remainder.

According to an implementation of another aspect, a computer-readable storage medium is further provided, where the computer-readable storage medium stores a computer program, and when the computer program runs on a computer, the computer is enabled to perform the methods described with reference FIG. 3 and FIG. 4.

According to an implementation of still another aspect, a computing device is further provided, including a memory and a processor, where the memory stores executable code, and when the processor executes the executable code, the methods described with reference FIG. 3 and FIG. 4 can be implemented.

A person skilled in the art should be aware that in the previous one or more examples, functions described in the present disclosure can be implemented by hardware, software, firmware, or any combination thereof. When the present disclosure is implemented by software, the functions can be stored in a computer readable medium or transmitted as one or more instructions or code in the computer readable medium.

The objectives, technical solutions, and benefits of the present disclosure are further described in detail in the earlier-described specific implementations. It should be understood that the earlier-described descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A computer-implemented method for data encryption, comprising:
   receiving, by a second peer end computing device, first data from a first peer end computing device;
   generating, by the second peer end computing device, a random term R based on a result range pre-agreed upon with the first peer end computing device, wherein the result range comprises a minimum result value a and a maximum result value b, the random term R is a product of a random number r and an agreed upon constant c that is agreed upon between the first peer end computing device and the second peer end computing device, and the agreed upon constant c is greater than a first difference between the maximum result value b and the minimum result value a;
   performing, by the second peer end computing device, a homomorphic operation based on the first data and local private second data thereby obtaining a first operation result;
   obtaining, by the second peer end computing device, a second difference between the first operation result and the minimum result value a as a second operation result;
   performing, by the second peer end computing device, homomorphic summation and encryption on the second operation result and the random term R thereby obtaining an encryption result; and
   returning, by the second peer end computing device, the encryption result to the first peer end computing device.

2. The computer-implemented method of claim 1, wherein the minimum result value a is 0, and the maximum result value b is an n-digit natural number, and wherein the agreed upon constant c is 10^n such that last n digits in the random term R that are sorted from a high digit to a low digit are all 0s, wherein n is a natural number.

3. The computer-implemented method of claim 1, wherein the minimum result value a is 0, the maximum result value b is 2^n, the agreed upon constant c is 2^(n+1), the random term R is represented in binary, and in a binary representation of the random term R, last n digits in the random term R sorted from a high digit to a low digit are all 0s, and wherein n is a natural number.

4. The computer-implemented method of claim 1, wherein a value of the agreed upon constant c is Δ+1, and wherein Δ is the first difference between the maximum result value b and the minimum result value a.

5. The computer-implemented method of claim 1, wherein the first data comprises encrypted data encrypted using a homomorphic encryption scheme.

6. A non-transitory, computer-readable medium storing one or more instructions executable by a computer system to perform operations comprising:
   receiving first data from a first peer end computing device;
   generating a random term R based on a result range pre-agreed upon with the first peer end computing device, wherein the result range comprises a minimum result value a and a maximum result value b, the random term R is a product of a random number rand an agreed upon constant c that is agreed upon between the first peer end computing device and a second peer, and the agreed upon constant c is greater than a first difference between the maximum result value b and the minimum result value a;

performing a homomorphic operation based on the first data and local private second data thereby obtaining a first operation result;

obtaining a second difference between the first operation result and the minimum result value a as a second operation result;

performing homomorphic summation and encryption on the second operation result and the random term R thereby obtaining an encryption result; and returning the encryption result to the first peer end computing device.

7. The non-transitory, computer-readable medium of claim 6, wherein the minimum result value a is 0, and the maximum result value b is an n-digit natural number, and wherein the agreed upon constant c is $10^n$ such that last n digits in the random term R that are sorted from a high digit to a low digit are all 0s, wherein n is a natural number.

8. The non-transitory, computer-readable medium of claim 6, wherein the minimum result value a is 0, the maximum result value b is $2^n$, the agreed upon constant c is $2^{(n+1)}$, the random term R is represented in binary, and in a binary representation of the random term R, last n digits in the random term R sorted from a high digit to a low digit are all 0s, and wherein n is a natural number.

9. The non-transitory, computer-readable medium of claim 6, wherein a value of the agreed upon constant c is $\Delta+1$, and wherein $\Delta$ is the first difference between the maximum result value b and the minimum result value a.

10. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving first data from a first peer end computing device;
generating a random term R based on a result range pre-agreed upon with the first peer end computing device, wherein the result range comprises a minimum result value a and a maximum result value b, the random term R is a product of a random number r and an agreed upon constant c that is agreed upon between the first peer end computing device and a second peer end, and the agreed upon constant c is greater than a first difference between the maximum result value b and the minimum result value a;
performing a homomorphic operation based on the first data and local private second data thereby obtaining a first operation result;
obtaining a second difference between the first operation result and the minimum result value a as a second operation result;
performing homomorphic summation and encryption on the second operation result and the random term R thereby obtaining an encryption result; and
returning the encryption result to the first peer end computing device.

11. The computer-implemented system of claim 10, wherein the minimum result value a is 0, and the maximum result value b is an n-digit natural number, and wherein the agreed upon constant c is $10^n$ such that last n digits in the random term R that are sorted from a high digit to a low digit are all 0s, wherein n is a natural number.

12. The computer-implemented system of claim 10, wherein the minimum result value a is 0, the maximum result value b is $2^n$, the agreed upon constant c is $2^{(n+1)}$, the random term R is represented in binary, and in a binary representation of the random term R, last n digits in the random term R sorted from a high digit to a low digit are all 0s, and wherein n is a natural number.

13. The computer-implemented system of claim 10, wherein a value of the agreed upon constant c is $\Delta+1$, and wherein $\Delta$ is the first difference between the maximum result value b and the minimum result value a.

* * * * *

UNITED STATES PATENT AND TRADEMARK OFFICE
CERTIFICATE OF CORRECTION

PATENT NO. : 10,911,216 B2
APPLICATION NO. : 16/888531
DATED : February 2, 2021
INVENTOR(S) : Lichun Li, Wenzhen Lin and Huazhong Wang Page 1 of 1

It is certified that error appears in the above-identified patent and that said Letters Patent is hereby corrected as shown below:

In the Claims

Column 14, Line 65, Claim 6, delete "rand" and insert -- r and --, therefor.

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*